United States Patent
Nguyen et al.

(10) Patent No.: US 8,199,545 B2
(45) Date of Patent: Jun. 12, 2012

(54) POWER-CONVERSION CONTROL SYSTEM INCLUDING SLIDING MODE CONTROLLER AND CYCLOCONVERTER

(75) Inventors: Vietson M. Nguyen, Rockford, IL (US); Gregory I. Rozman, Rockford, IL (US); Sastry V. Vedula, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 489 days.

(21) Appl. No.: 12/435,534

(22) Filed: May 5, 2009

(65) Prior Publication Data

US 2010/0284208 A1    Nov. 11, 2010

(51) Int. Cl.
*H02M 7/797* (2006.01)
*H02M 5/16* (2006.01)

(52) U.S. Cl. .............. 363/165; 363/8; 363/164
(58) Field of Classification Search .......... 363/95, 363/97, 98, 131, 132, 157, 159, 164, 165, 363/2, 8, 9, 10, 163
See application file for complete search history.

(56) References Cited

U.S. PATENT DOCUMENTS

| | | | |
|---|---|---|---|
| 3,959,720 A | 5/1976 | Bose et al. | |
| 3,982,167 A | 9/1976 | Espelage | |
| 4,240,135 A * | 12/1980 | Schaefer, III | 363/43 |
| 4,349,867 A | 9/1982 | Otsuka et al. | |
| 4,442,396 A | 4/1984 | Hucker | |
| 4,479,175 A * | 10/1984 | Gille et al. | 363/41 |
| 4,570,214 A | 2/1986 | Tanaka | |
| 4,625,160 A | 11/1986 | Hucker | |
| 4,695,736 A | 9/1987 | Doman et al. | |
| 4,792,741 A | 12/1988 | Matsuo et al. | |
| 4,878,163 A * | 10/1989 | Yamato et al. | 363/8 |
| 5,274,538 A * | 12/1993 | Sashida et al. | 363/8 |
| 5,285,365 A * | 2/1994 | Yamato et al. | 363/8 |
| 5,285,371 A * | 2/1994 | Sanada et al. | 363/71 |
| 5,384,527 A | 1/1995 | Rozman et al. | |
| 5,388,041 A * | 2/1995 | Carpita | 363/98 |
| 5,747,971 A | 5/1998 | Rozman et al. | |
| 6,181,076 B1 * | 1/2001 | Trestman et al. | 315/224 |
| 6,466,465 B1 * | 10/2002 | Marwali | 363/41 |
| 6,507,503 B2 * | 1/2003 | Norrga | 363/17 |
| 6,879,062 B2 * | 4/2005 | Oates | 307/140 |
| 7,187,569 B2 * | 3/2007 | Sinha et al. | 363/160 |
| 7,573,732 B2 * | 8/2009 | Teichmann et al. | 363/51 |

* cited by examiner

*Primary Examiner* — Gary L Laxton
(74) *Attorney, Agent, or Firm* — Carlson Gaskey & Olds P.C.

(57) ABSTRACT

A power-conversion control system includes an inverter, a cycloconverter, and a sliding mode controller. The inverter is operable to receive a DC voltage input and produce a first AC voltage output having a first frequency. The cycloconverter has a plurality of bidirectional switches, and is operable to receive the first AC voltage and to synthesize a second AC voltage having a second frequency that is lower than the first frequency. The sliding mode controller is operable to provide a control signal to command the plurality of bidirectional switches to turn OFF and ON when the first AC voltage is at a zero crossing condition. The sliding mode controller is also operable to selectively adjust the frequency and amplitude of the second AC voltage.

20 Claims, 5 Drawing Sheets

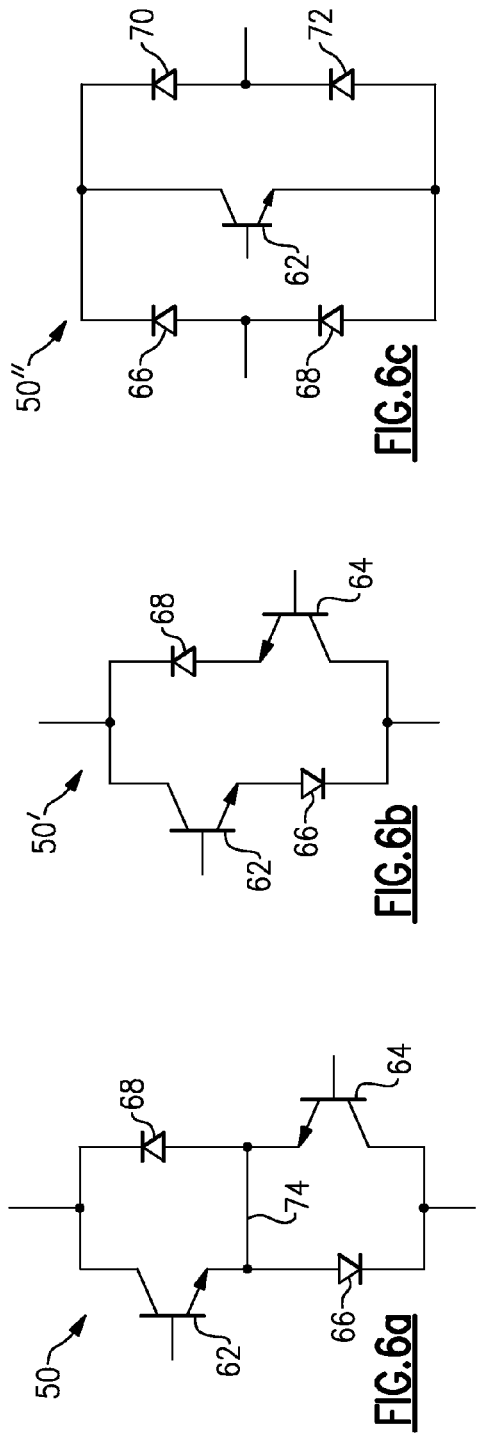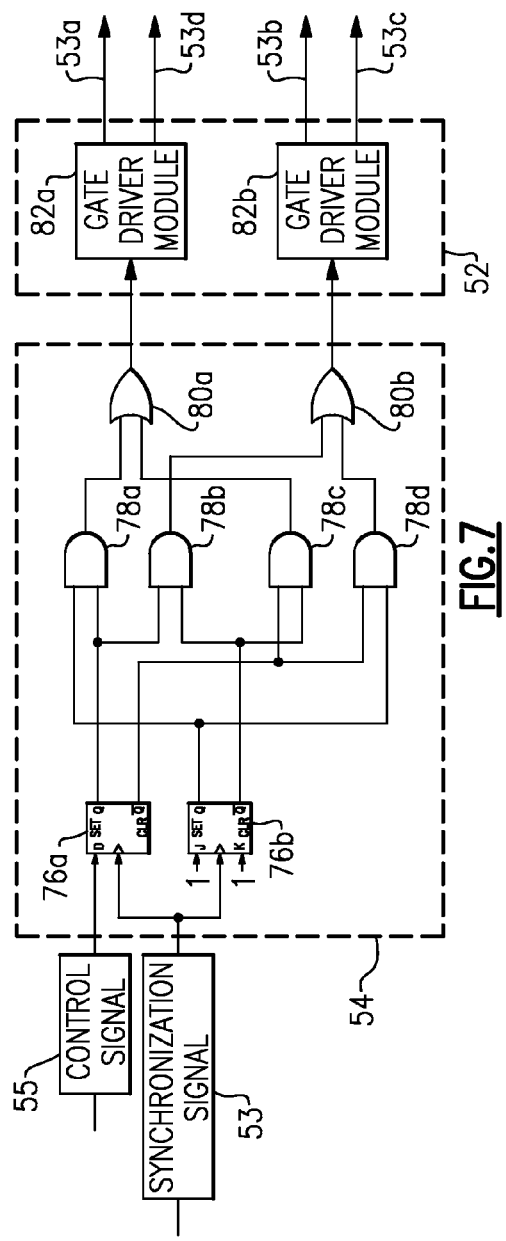

POWER-CONVERSION CONTROL SYSTEM INCLUDING SLIDING MODE CONTROLLER AND CYCLOCONVERTER

BACKGROUND OF THE INVENTION

This application relates to a power-conversion control system, and more particularly to a power-conversion control system including a sliding mode controller and a cycloconverter.

Some aircraft, such as military fighter aircraft, utilize various alternating current ("AC") weapon and instrument systems. To use those devices in direct current ("DC") power systems, specially designed inverters (known as "non-linear inverters" for their use with non-linear loads) have been used to perform a DC to AC power conversion. Some non-linear inverters were designed to utilize 400 Hz step-up three-phase transformers, which are heavy and bulky, and which have produced significant harmonic distortion.

SUMMARY OF THE INVENTION

A power-conversion control system includes an inverter, a cycloconverter, and a sliding mode controller. The inverter is operable to receive a DC voltage input and produce a first AC voltage output having a first frequency. The cycloconverter has a plurality of bidirectional switches, and is operable to receive the first AC voltage and to synthesize a second AC voltage having a second frequency that is lower than the first frequency. The sliding mode controller is operable to provide a control signal to command the plurality of bidirectional switches to turn OFF and ON when the first AC voltage is at a zero crossing condition. The sliding mode controller is also operable to selectively adjust the frequency and amplitude of the second AC voltage.

A method of providing alternating current to a load includes converting a DC voltage into a first AC voltage having a first frequency. A plurality of switches in a cycloconverter is commanded to turn OFF or ON to synthesize a second AC voltage having a second frequency that is lower than the first frequency. The plurality of switches is turned OFF or ON when first AC voltage is at a zero crossing condition. The rate at which the plurality of switches are turned OFF and ON is selectively adjusted in response to a voltage feedback signal and a current feedback signal to minimize a difference between the voltage feedback signal and a desired voltage.

These and other features of the present invention can be best understood from the following specification and drawings, the following of which is a brief description.

BRIEF DESCRIPTION OF THE DRAWINGS

FIG. 6*a* schematically illustrates a first bidirectional switch.

FIG. 6*b* schematically illustrates a second bidirectional switch.

FIG. 6*c* schematically illustrates a third bidirectional switch.

FIG. 7 schematically illustrates a signal steering block of the power-conversion control system of FIG. 1.

DETAILED DESCRIPTION OF THE PREFERRED EMBODIMENT

Figure 1:
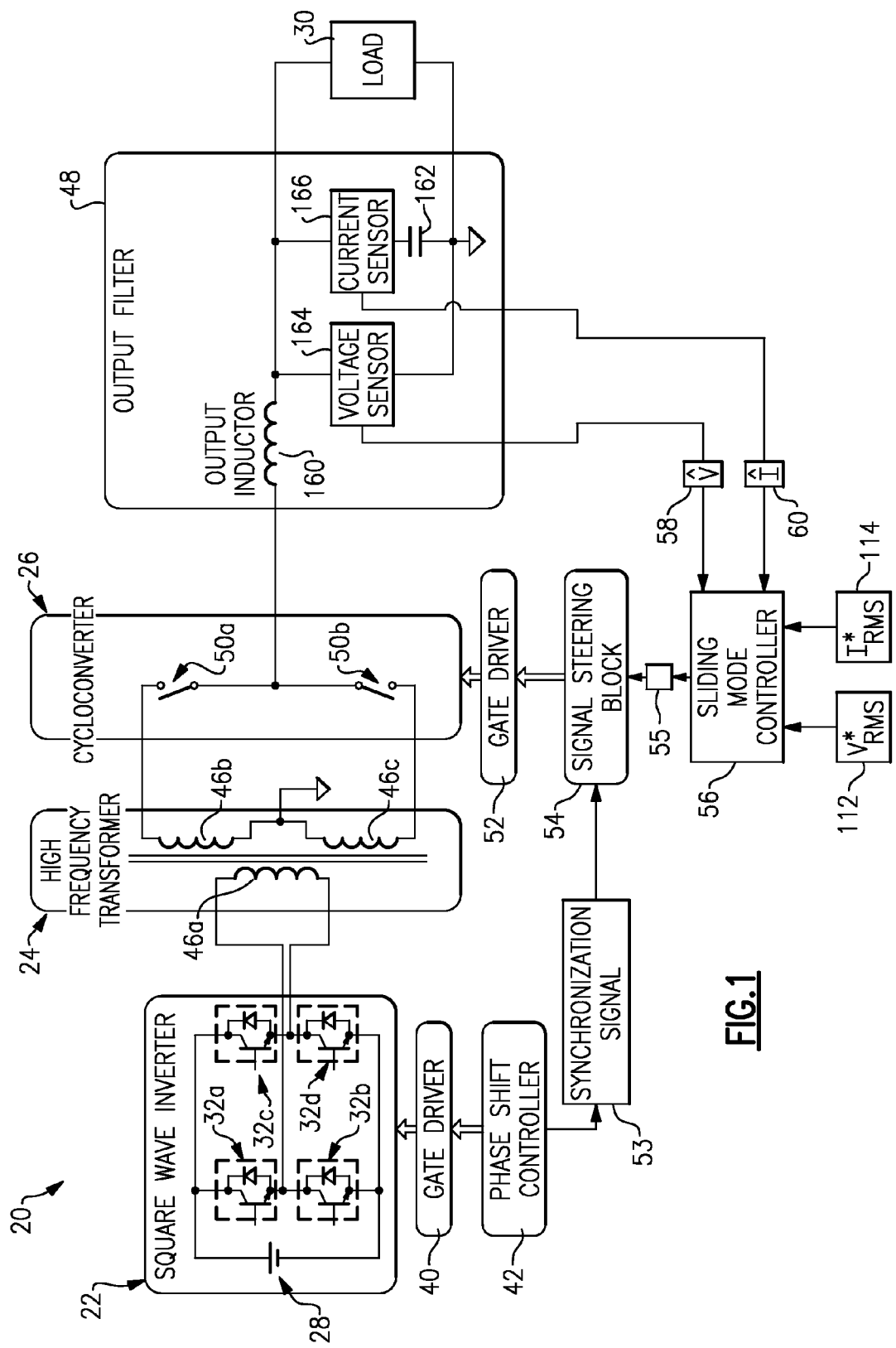
FIG. 1 schematically illustrates a single phase power-conversion control system.

FIG. 1 schematically illustrates a single phase power-conversion control system 20. This power-conversion control system 20 could be used, for example, in vehicles such as aircraft. Of course other applications would also be possible. The system 20 includes a high-frequency square-wave inverter 22, a high-frequency isolation transformer 24, and a cycloconverter 26. The inverter 22 is operable to convert a voltage from a DC power source 28 to a first, high frequency AC voltage. In one example the frequency of the first, high frequency AC voltage is on the order of 20 KHz to well over 100 kHz. Of course, other high frequencies would be possible. The transformer 24 includes a plurality of inductive windings 46*a-c* and is operable to electrically isolate the square-wave inverter 22 from the cycloconverter 26, and is also operable to step-up or step-down the amplitude of the high frequency voltage to a desired level. Although FIG. 1 illustrates the transformer 24 as having three inductive windings 46*a-c*, other electromagnetic coupling topologies could be utilized.

Figure 2:
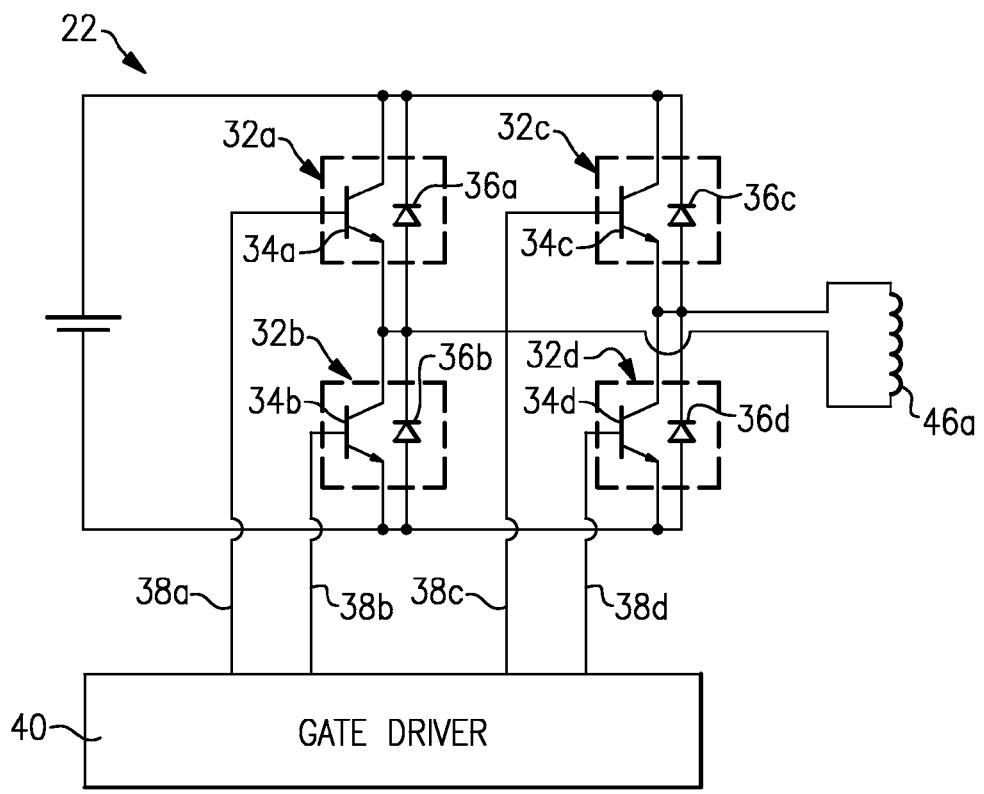
FIG. 2 schematically illustrates a high frequency square wave inverter of the power-conversion control system of FIG. 1.

The square-wave inverter 22 includes a plurality of power switches 32*a-d*. As shown in FIG. 2, each power switch 32 includes a controllable switch 34 and a diode 36 connected in parallel. Each controllable switch 34 could correspond to any of a variety of switching devices, such as a MOSFET, BJT, JFET, IGBT, etc. A gate of each switch 34*a-d* is connected to a gate driver 40 via inputs 38*a-d*. Although the gate driver 40 is shown as a single unit, it is understood that the gate driver 40 could include a plurality of gate drivers.

Figure 3:
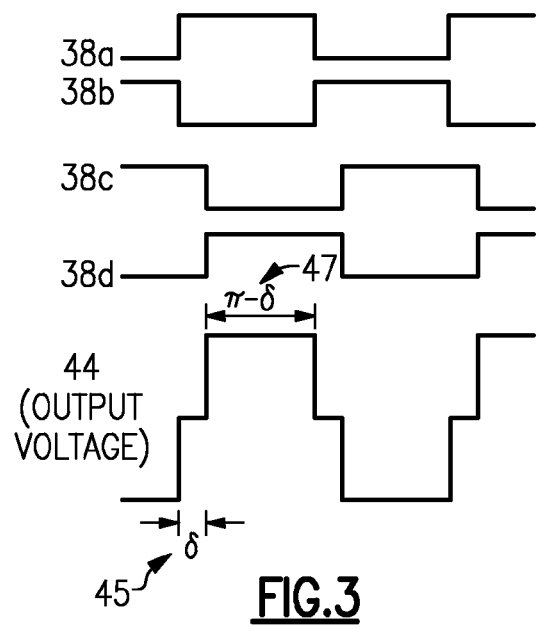
FIG. 3 schematically illustrates a plurality of input signals and an output signal for the square wave inverter of FIG. 2.

A phase shift controller 42 (see FIG. 1) controls the gate driver 40 and selectively commands the power switches 32*a-d* to turn ON and OFF to produce a square wave output voltage 44 which corresponds to the first high frequency AC voltage (see FIG. 3). As shown in FIG. 3, the square wave output 44 approximates a square wave AC waveform. The output voltage 44 has a value of zero at an adjustable time period 45 ("δ"). The phase shift controller 42 is operable to adjust the duration of time period 45 ("δ"). The phase shift controller 42 transmits a synchronization signal 53 to a signal steering block 54 (see FIG. 1) to indicate when the output voltage 44 is at the zero voltage. A lag 47 ("π-δ") represents the time between switching of signals 38*a-b* and 38*c-d*.

Referring to FIG. 1, the cycloconverter 26 includes a plurality of bidirectional switches 50*a-b* and is operable to receive the first, high frequency AC voltage and to synthesize a second AC voltage having a second frequency that is lower than the first frequency. In one example the second frequency is on the order of 50 Hz-400 Hz. Of course, it is possible that other frequencies could be used. A gate driver 52 (see FIG. 1) is operable to turn the bidirectional switches 50*a-b* OFF or ON to synthesize the second AC voltage. Although the gate driver 52 is shown as a single unit, it is understood that the gate driver 52 could include a plurality of gate drivers.

A signal steering block 54 provides ON/OFF signals to the gate driver 52, and receives the synchronization signal 53 from the phase shift controller 42. A sliding mode controller 56 is operable to receive a voltage feedback signal 58 ("$\hat{V}$") and a current feedback signal 60 ("$\hat{I}$") from the output filter 48, and is operable to provide a control signal 55 to control the signal steering block 54. The synchronization signal 53 enables the cycloconverter 26 to be synchronized with the inverter 22 so that the cycloconverter can turn the bidirectional switches 50*a-b* ON and OFF when the first AC voltage is at the zero crossing condition (or "zero voltage transition"), as indicated by time period 45 in FIG. 3.

Figure 4:
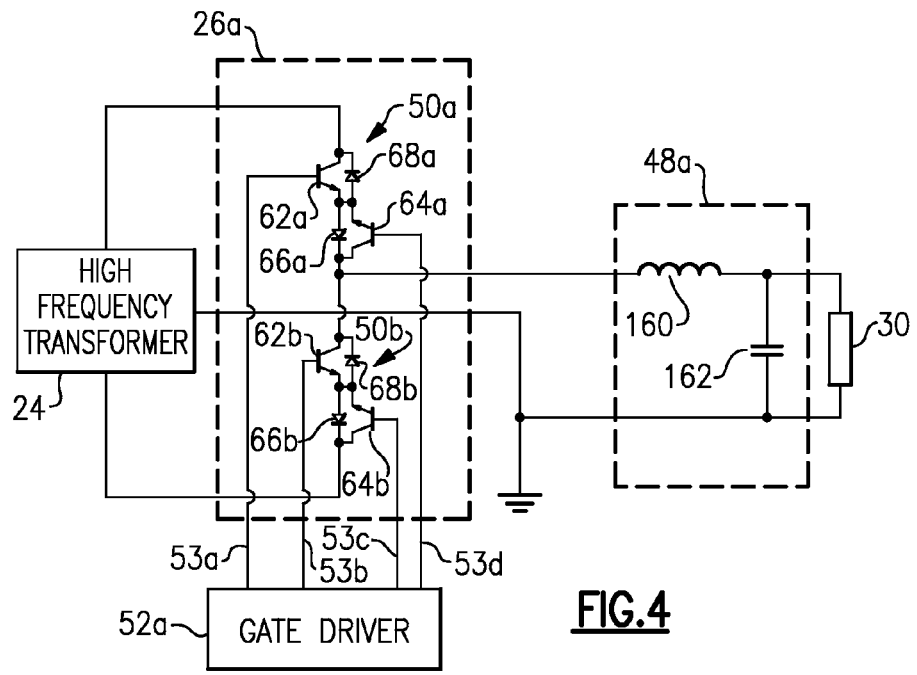
FIG. 4 schematically illustrates a single phase cycloconverter of FIG. 1.

FIG. 4 schematically illustrates a single-phase cycloconverter 26*a*. Each bidirectional switch 50*a-b* (see FIG. 1) includes a first switch 62, a second switch 64, a first diode 66, and a second diode 68. Gate driver 52*a* provides control signals 53*a-d* to the gates of the switches 62*a-b*, 64*a-b* to selectively turn the switches 62*a-b*, 64*a-b* OFF and ON.

Figure 5:
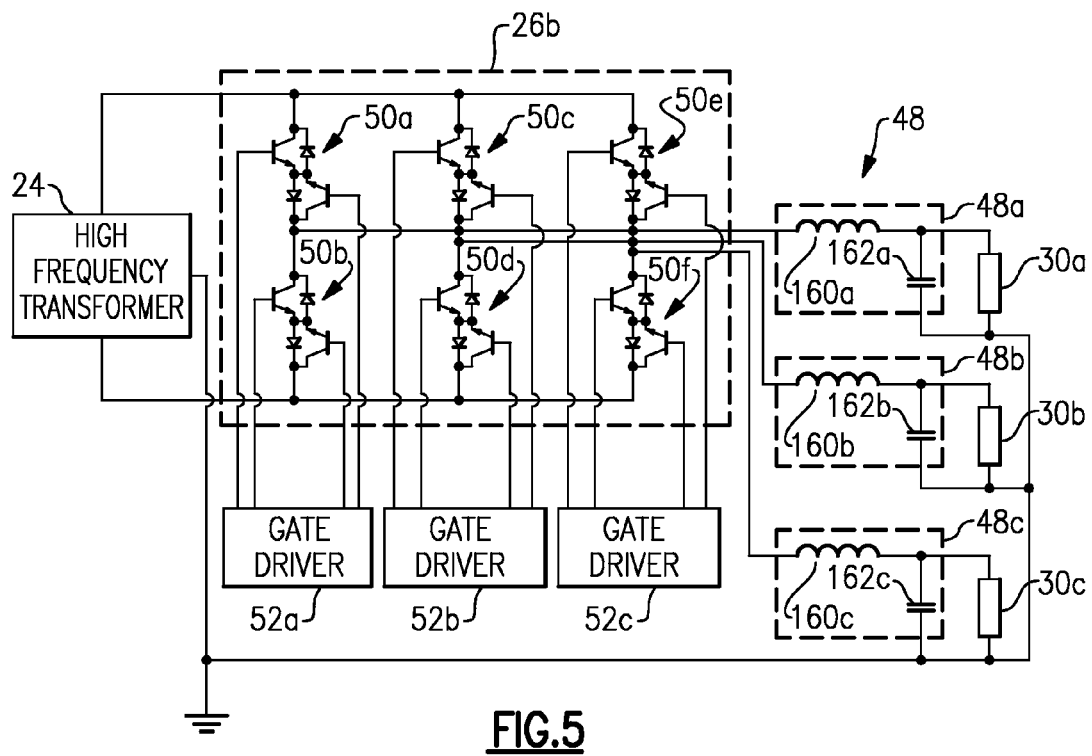
FIG. 5 schematically illustrates a three phase cycloconverter.

Of course, the cycloconverter 26*a* does not have to be a single-phase cycloconverter, and could be configured for other quantities of phases. FIG. 5, for example, schematically illustrates a three-phase cycloconverter 26*b*. In this example bidirectional switches 50*a*, 50*b* are driven by a first gate driver 52*a* and their output corresponds to a first phase of current which is electrically connected to a first output filter 48*a* and a first load 30*a*. Bidirectional switches 50*c*, 50*d* are driven by a second gate driver 52*b* and their output corresponds to a second phase of current which is electrically connected to a second output filter 48*b* and a second load 30*b*. Bidirectional switches 50*e*, 50*f* are driven by a third gate driver 52*c* and their output corresponds to a third phase of current which is electrically connected to a third output filter 48*c* and a third load 30*c*. The three phases of current can be evenly spaced apart at 120°, 240°, and 360° respectively. In one example, each gate driver 52*a-b* would be connected to its own sliding mode controller 56. Also, although three loads 30*a-c* are illustrated, it is possible that the loads 30*a-c* could correspond to a single load receiving all three phases of AC.

FIGS. 6*a-c* illustrates a variety of bidirectional switches 50, 50' 50". FIG. 6*a* schematically illustrates the bidirectional switch 50 of FIG. 4 that includes a switch 62 and a diode 68 electrically connected in parallel, and a switch 64 and diode 66 electrically connected in parallel. The switch 62 and diode 68 are electrically connected in series to the switch 64 and diode 66 via a connection 74.

FIG. 6*b* schematically illustrates a bidirectional switch 50' that omits the connection 74. Thus, in FIG. 6*b* the switch 62 and diode 66 are electrically connected in series, and the switch 64 and diode 68 are also electrically connected in series. Without the connection 74, the switch 62 and diode 66 are electrically connected in parallel with the switch 64 and diode 68.

FIG. 6*c* schematically illustrates a bidirectional switch 50" that includes a single switch 62 electrically connected in parallel with a first pair of diodes 66, 68 and electrically connected in parallel with a second pair of diodes 70, 72. It is understood that the switches 62, 64 as shown in FIGS. 6*a-c* could correspond to a variety of switching devices, such as a MOSFET, BJT, JFET, IGBT, etc.

FIG. 7 schematically illustrates the signal steering block 54 of FIG. 1 in greater detail. Control signal 55 is connected to flip-flop 76*a*, and synchronization signal 53 is connected to flip-flops 76*a* and 76*b*. The outputs of flip-flops 76*a-b* are connected to AND gates 78*a-d*, whose outputs are connected to OR gates 80*a-b*. The output of OR gate 80*a* is fed into gate driver module 82*a* which splits the output signal into identical signals 53*a* and 53*d* (see FIG. 4). The output of OR gate 80*b* is fed into gate driver module 82*b* which splits the output signal into identical signals 53*b* and 53*c* (see FIG. 4).

Figure 8:
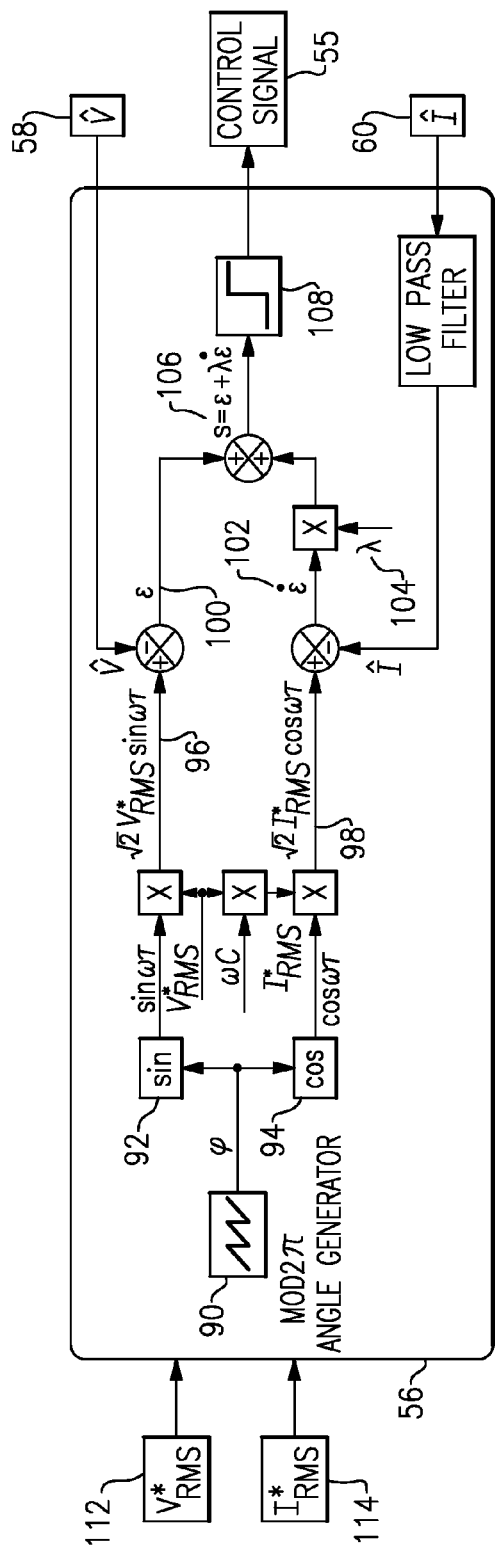
FIG. 8 schematically illustrates a sliding mode controller of the power-conversion control system of FIG. 1.

FIG. 8 schematically illustrates the sliding mode controller 56 of FIG. 1 in greater detail. The sliding mode controller 56 is operable to adjust the rate at which the bidirectional switches 50 are turned OFF and ON to adjust the frequency, and consequently the magnitude, of the second voltage. By adjusting this rate, the sliding mode controller 56 can minimize the difference between the voltage feedback signal 58 and the desired voltage signal 96 ("v*"), and can also minimize the difference between the current feedback signal 60 and the desired current signal 98 ("i*"). The signals i* and v* are lowercase to indicate that they are time-varying signals. The asterisk ("*") symbol denotes that the signals i* and v* are reference signals, as opposed to signals $\hat{V}$ and $\hat{I}$ which include a carat ("^") to denote that they are feedback signals). The following equations can be used to determine v* and i*:

$$v^* = \sqrt{2} V^*_{RMS} \sin \omega t \quad \text{equation \#1}$$

where $V^*_{RMS}$ is a root-mean squared voltage reference signal 112; and

ω is a fundamental frequency of inverter 22 (which can be measured in radians per second).

$$i^* = \sqrt{2} I^*_{RMS} \cos \omega t \quad \text{equation \#2}$$

where $I^*_{RMS}$ is a root-mean squared current reference signal 114.

$$I^*_{RMS} = V^*_{RMS} \omega C \quad \text{equation \#3}$$

where C is the capacitance of capacitor 162.

The sliding mode controller 56 receives the voltage feedback signal 58 ("$\hat{V}$"), the current feedback signal 60 ("$\hat{I}$"), the voltage reference signal 112 ("$V^*_{RMS}$") and the current reference signal 114 ("$I^*_{RMS}$") as inputs. Because the cycloconverter 26 yields an AC output, root-mean squared ("RMS") current and voltage values are used in calculating control signal 55.

An angle generator 90 produces a signal ("φ") which is then processed by a sine module 92 and a cosine module 94 to provide time-varying capacitor voltage and capacitor reference signals (see v* and i* equations #1, #2 above and equations #4, #5 below). The fixed amplitude capacitor voltage and capacitor current values are used to calculate desired voltage signal 96 ("v*") and desired current signal 98 ("i*"). The signals 58, 96 are used to calculate a first error signal 100 ("ε"), and the signals 60, 98 are used to calculate a second error signal 102 ("$\dot{\varepsilon}$"). The error signal 100 corresponds to a difference between the voltage feedback signal 58 and the desired voltage signal 96 ("v*"). The second error signal 102 ("$\dot{\varepsilon}$") corresponds to a derivative of the first error signal 100. The sliding mode controller 56 uses the error signals 100, 102 and a coefficient 104 ("λ") to calculate signal 106 ("S"). The signal 106 is passed through a zero-crossing detector 108 to produce control signal 55.

Since current can be calculated as a derivative of voltage, the controller feedback signal can be calculated with either of the following equations:

$$S = (v^* - \hat{V}) + \lambda(i^* - \hat{I}) \quad \text{equation \#4}$$

$$S = (v^* - \hat{V}) + \lambda \cdot \frac{d}{dt}(v^* - \hat{V}) \quad \text{equation \#5}$$

where S is signal 106;

λ is a coefficient 104;

$\hat{V}$ is the voltage feedback signal 58;

v* is the time-varying desired voltage signal 96;
Î is the current feedback signal 60; and
i* is the time-varying desired current signal 98.

Also, the error signals 100, 102 may be expressed in relation to equations #4 and #5 above.

$$\varepsilon = v^* - \hat{V} \qquad \text{equation \#6}$$

$$\dot{\varepsilon} = \frac{d}{dt}(v^* - \hat{V}) \qquad \text{equation \#7}$$

Figure 9:
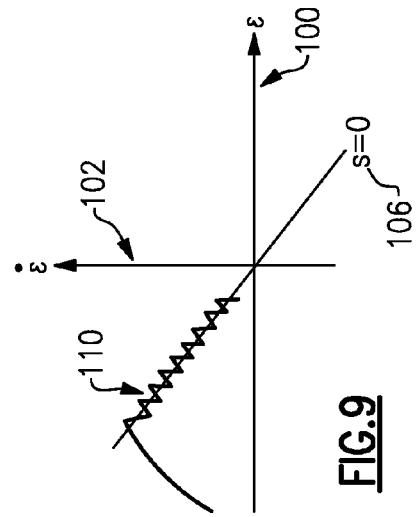
FIG. 9 schematically illustrates a sliding mode trajectory of the sliding mode controller of FIG. 8.

FIG. 9 schematically illustrates a sliding mode trajectory 110 of the sliding mode controller 56. The horizontal axis represents the first error signal 100 ("ε") and the vertical axis represents the second error signal 102 ("ε̇"). The sliding mode controller 56 switches between "ON" and "OFF" states along the trajectory 110 along reference plane 106, as shown in FIG. 9, enabling the system 20 to accurately track the desired voltage waveform reference v*. The value of coefficient 104 ("λ") determines a slope of the trajectory 110. The system 20 of FIG. 1 "slides" along the trajectory 110 toward the origin (i.e. intersection of axes 100, 102) exponentially with a time constant of 1/λ.

Although multiple embodiments of this invention have been disclosed, a worker of ordinary skill in this art would recognize that certain modifications would come within the scope of this invention. For that reason, the following claims should be studied to determine the true scope and content of this invention.

What is claimed is:

1. A power-conversion control system comprising:
an inverter operable to receive a DC voltage input and produce a first AC voltage output having a first frequency;
a cycloconverter having a plurality of bidirectional switches, and being operable to receive the first AC voltage and to synthesize a second AC voltage having a second frequency that is lower than the first frequency; and
a sliding mode controller operable to provide a control signal to command the plurality of bidirectional switches to turn OFF and ON when the first AC voltage is at a zero crossing condition, and operable to selectively adjust the frequency and amplitude of the second AC voltage.

2. The system of claim 1, wherein the sliding mode controller selectively adjusts the frequency of the second AC voltage by selectively adjusting a rate at which the plurality of bidirectional switches are turned OFF and ON.

3. The system of claim 1, wherein the sliding mode controller selectively adjusts a rate at which the plurality of bidirectional switches are turned OFF and ON in response to a voltage feedback signal and a current feedback signal, and wherein the sliding mode controller adjusts the rate to minimize a difference between the voltage feedback signal and a desired voltage.

4. The system of claim 1, including a transformer operable to electrically isolate the inverter from the cycloconverter.

5. The system of claim 1, further comprising:
an output filter operable to remove high frequency components of the second AC voltage.

6. The system of claim 5, wherein the output filter includes at least one capacitor and at least one inductive winding, and is electrically connected to the cycloconverter and to at least one load.

7. The system of claim 6, wherein the at least one load corresponds to at least one electrical device in or on an aircraft.

8. The system of claim 1, further comprising:
a phase shift controller operable to command at least one first gate driver to turn a plurality of power switches in the inverter OFF or ON.

9. The system of claim 8, wherein each of the plurality of power switches includes a switch and a diode electrically connected in parallel.

10. The system of claim 8, wherein the signal steering block includes a plurality of flip-flops, a plurality of AND gates, and a plurality of OR gates.

11. The system of claim 8, wherein said phase shift controller is operable to output a synchronization signal indicating when the first AC voltage is at a zero crossing condition.

12. The system of claim 1, wherein the first AC voltage is a square wave voltage.

13. The system of claim 1, wherein at least one of the plurality of bidirectional switches includes a first switch and a first diode electrically connected in parallel, and a second switch and a second diode electrically connected in parallel, wherein the first switch and first diode are electrically connected in series to the second switch and second diode.

14. The system of claim 1, wherein at least one of the plurality of bidirectional switches includes a first switch and a first diode electrically connected in series, and a second switch and a second diode electrically connected in series, wherein the first switch and first diode are electrically connected in parallel with the second switch and the second diode.

15. The system of claim 1, wherein at least one of the plurality of bidirectional switches includes a switch electrically connected in parallel with a first pair of diodes, and electrically connected in parallel with a second pair of diodes.

16. The system of claim 1, further comprising a signal steering block operable to command at least one second gate driven to turn the bidirectional switches to turn OFF or ON in response to the control signal from the sliding mode controller, and a synchronization signal.

17. A power-conversion control system comprising:
an inverter operable to receive a DC voltage input and produce a first AC voltage output having a first frequency;
a cycloconverter having a plurality of bidirectional switches, and being operable to receive the first AC voltage and to synthesize a second AC voltage having a second frequency that is lower than the first frequency;
a sliding mode controller operable to provide a control signal to command the plurality of bidirectional switches to turn OFF and ON when the first AC voltage is at a zero crossing condition, and operable to selectively adjust the frequency and amplitude of the second AC voltage;
a phase shift controller operable to command at least one first gate driver to turn a plurality of power switches in the inverter OFF or ON; and
a signal steering block operable to command at least one second gate driver to turn the bidirectional switches to turn OFF or ON in response to the control signal from the sliding mode controller and a synchronization signal from the phase shift controller, wherein the synchronization signal indicates when the first AC voltage is at a zero crossing condition.

18. A method of providing alternating current to a load, comprising:
converting a DC voltage into a first AC voltage having a first frequency;
commanding a plurality of switches in a cycloconverter turn OFF or ON to synthesize a second AC voltage having a second frequency that is lower than the first frequency, wherein the plurality of switches are turned OFF or ON when first AC voltage is at a zero crossing condition; and
selectively adjusting a rate at which the plurality of switches are turned OFF and ON in response to a voltage feedback signal and a current feedback signal to minimize a difference between the voltage feedback signal and a desired voltage.

19. The method of claim 18, further comprising:
generating a synchronization signal to indicate when the first AC voltage is at a zero crossing condition.

20. The method of claim 18, further comprising:
filtering out high frequency components of the second AC voltage; and
coupling the filtered second AC voltage to at least one load.

* * * * *